(12) United States Patent
Cho et al.

(10) Patent No.: US 10,224,971 B1
(45) Date of Patent: Mar. 5, 2019

(54) SYMBOL RATE ESTIMATING DEVICE AND METHOD AND ADJACENT CHANNEL INTERFERENCE DETECTING DEVICE

(71) Applicant: MStar Semiconductor, Inc., Hsinchu Hsien (TW)

(72) Inventors: Ting-Nan Cho, Hsinchu Hsien (TW); Kai-Wen Cheng, Hsinchu Hsien (TW); Tai-Lai Tung, Hsinchu Hsien (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 15/909,116

(22) Filed: Mar. 1, 2018

(30) Foreign Application Priority Data

Sep. 1, 2017 (TW) .............................. 106129866 A (51) Int. Cl.
*H04B 1/12* (2006.01)
*H04B 1/10* (2006.01)
*H04L 25/02* (2006.01)

(52) U.S. Cl.
CPC ........... *H04B 1/1027* (2013.01); *H04B 1/123* (2013.01); *H04L 25/0236* (2013.01)

(58) Field of Classification Search
CPC .... H04B 1/1027; H04B 1/123; H04L 25/0236
USPC ........................................................ 375/346
See application file for complete search history.

*Primary Examiner* — Michael R Neff
(74) *Attorney, Agent, or Firm* — Edell, Shapiro & Finnan, LLC (57) ABSTRACT

A symbol rate estimating device includes: a power spectrum density (PSD) estimating unit, estimating a PSD of an input signal; an index searching unit, searching for a cut-off frequency index in the PSD; an adjacent channel interference (ACI) detecting unit, detecting whether the input signal has ACI to generate a detection signal; a threshold adjusting unit, generating an adjusted index number threshold according to the detection signal; an index output unit, outputting the cut-off frequency index according to the adjusted index number threshold; and a symbol calculating unit, calculating a symbol rate of the input signal according to the cut-off frequency index.

9 Claims, 9 Drawing Sheets

SYMBOL RATE ESTIMATING DEVICE AND METHOD AND ADJACENT CHANNEL INTERFERENCE DETECTING DEVICE

This application claims the benefit of Taiwan application Serial No. 106129866, filed on Sep. 1, 2017, the subject matter of which is incorporated herein by reference.

BACKGROUND OF THE INVENTION

Field of the Invention

The invention relates to a symbol rate estimating device, and more particularly to a symbol rate estimating device suitable for satellite communication standards.

Description of the Related Art

In satellite communication standards, such as Digital Video Broadcasting-Satellite (DVB-S), Digital Video Broadcasting-Satellite Generation 2 (DVB-S2), and Digital Video Broadcasting-Satellite Generation 2 Extensions (DVB-S2X), a receiver needs to estimate a symbol rate of the transmitter in order to demodulate received signal. However, when a received signal has adjacent channel interference (ACI), the receiver may incorrectly estimate the symbol rate.

SUMMARY OF THE INVENTION

Therefore, it is an object of the present invention to provide a symbol rate estimating device and method capable of reducing the effect of adjacent channel interference (ACI).

The present invention discloses a symbol rate estimating device including: a power spectrum density (PSD) estimating unit, estimating a PSD of an input signal, wherein the PSD includes a plurality of frequency indices respectively corresponding to a plurality of powers; an index searching unit, searching for a cut-off frequency in the PSD; an adjacent channel interference (ACI) detecting unit, detecting whether the input signal has ACI to generate a detection signal; a threshold adjusting unit, generating an adjusted index number threshold according to the detection signal indicating that the input signal has ACI; an index output unit, outputting the cut-off frequency index according to the adjusted index number threshold; and a symbol rate calculating unit, calculating a symbol rate of the input signal according to the cut-off frequency index.

The present invention further discloses a symbol rate estimating method including: estimating a PSD of an input signal, wherein the PSD includes a plurality of frequency indices respectively corresponding to a plurality of powers; searching for a cut-off frequency index in the PSD; detecting whether the input signal has ACI to generate a detection signal; generating an adjusted index number threshold according to the detection signal indicating that the input signal has ACI; outputting the cut-off frequency according to the adjusted index number threshold; and calculating a symbol rate of the input signal according to the cut-off frequency index.

The present invention further discloses an ACI detecting device including: a PSD estimating unit, estimating a PSD of an input signal, wherein the PSD includes a plurality of frequency indices respectively corresponding to a plurality of powers; a cut-off frequency index searching unit, searching for a cut-off frequency index in the PSD; an accumulating unit, accumulating a plurality of consecutive indices subsequent to the cut-off frequency, wherein the corresponding powers of the consecutive indices are greater than an index number of the cut-off frequency; a checking unit, checking whether the index number is equal to a predetermined index number threshold to generate a control signal; and an output unit, outputting a detection signal indicating that the input signal has ACI according to the control signal.

The above and other aspects of the invention will become better understood with regard to the following detailed description of the non-limiting embodiments. The following description is made with reference to the accompanying drawings.

DETAILED DESCRIPTION OF THE INVENTION

The terms used in the following description are customary terms in the technical field. If some of the terms are described or defined in the application, these terms are explained based on the description or definitions of the application.

The disclosure of the present invention includes a device and a method. Some of components of the device are individually known elements. Without affecting full disclosure and possible implementation of the present invention, the details of the individually known elements are omitted. Further, the method of the present invention may be in form of software and/or firmware, and may be executed by the device or the present invention or its equivalence.

Figure 1:
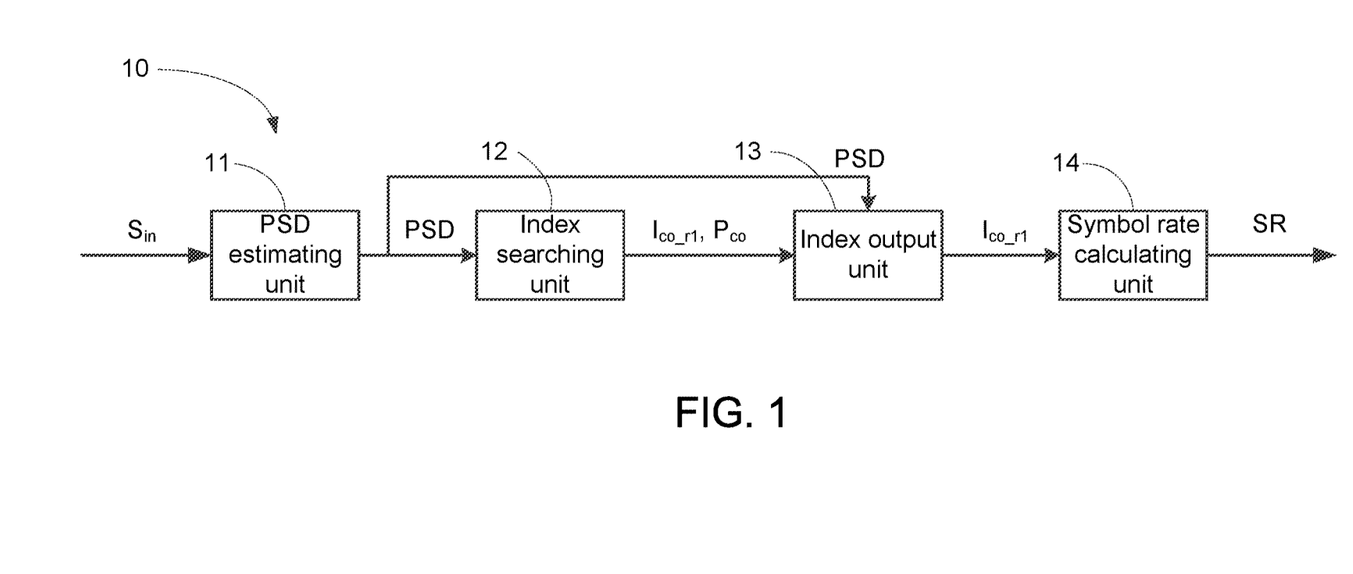
FIG. 1 is a block diagram of a symbol rate estimating device.

FIG. 1 shows a block diagram of a symbol rate estimating device 10. The symbol rate estimating device 10 includes a power spectrum density (PSD) estimating unit 11, an index searching unit 12, an index output unit 13 and a symbol rate calculating unit 14.

Figure 2:
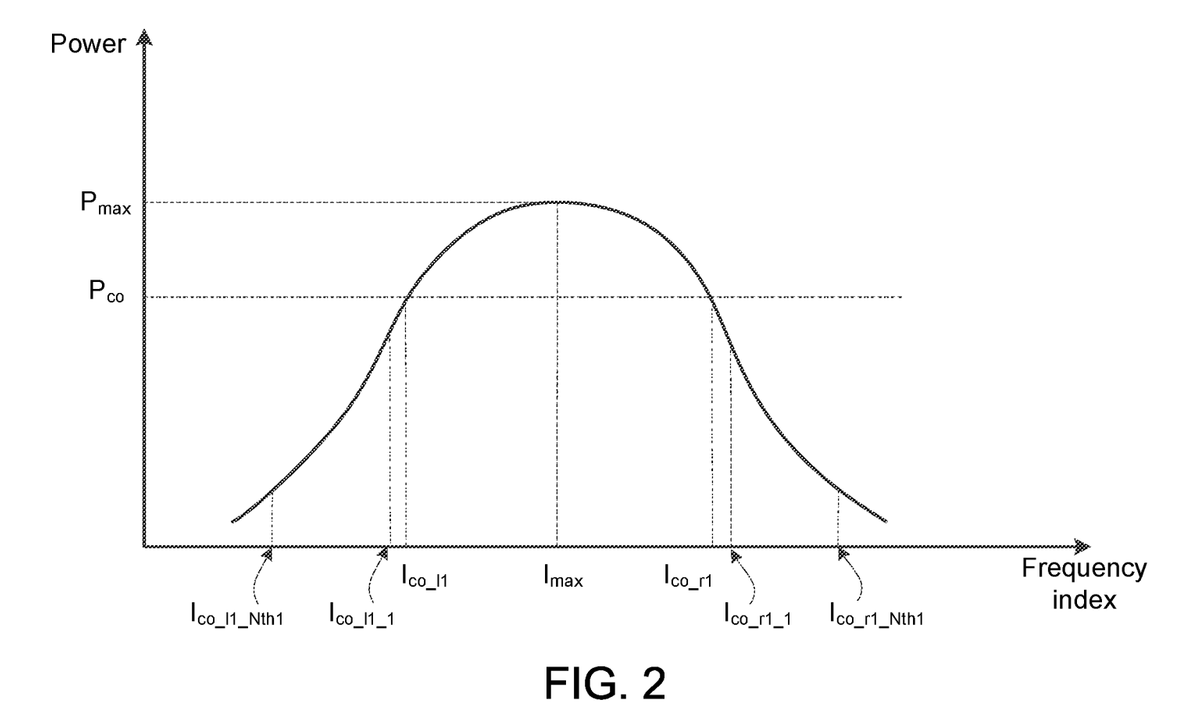
FIG. 2 is a schematic diagram of an example of a power spectrum density (PSD) of an input signal.

The PSD estimating unit 11 estimates a PSD of an input signal. In one embodiment, the PSD estimating unit 11 first performs Fourier transform on an input signal $S_{in}$ to generate a transformed signal, and estimates the PSD of the input signal $S_{in}$ according to the transformed signal. FIG. 2 shows a schematic diagram of an example of a PSD of an input signal, wherein the horizontal axis represents frequency index and the vertical axis represents power. The PSD includes a plurality of frequency indices respectively corresponding to a plurality of powers. Thus, according to the PSD, the power corresponding to each frequency index can be learned.

The index searching unit 12 searches for a cut-off frequency index in the PSD. Referring to FIG. 2, in one embodiment, the index searching unit 12 identifies a maximum power $P_{max}$ in the PSD, and accordingly identifies a maximum power index $I_{max}$ corresponding to the maximum power $P_{max}$, as shown in FIG. 2. The index searching unit 12 further identifies a cut-off power $P_{co}$ in the PSD. For example, the cut-off power $P_{co}$ is a 3 db, 6 db or 9 db cut-off power, as shown in FIG. 2. Next, starting from the maximum power frequency index $I_{max}$ and towards the right side, the index searching unit 12 identifies the frequency index corresponding to the cut-off power $P_{co}$ as a cut-off frequency index $I_{co\_r1}$, as shown in FIG. 2, and stores the cut-off frequency index $I_{co\_r1}$ to a buffer (not shown) in the index output unit 13.

The index output unit 13 outputs the cut-off frequency index according to an index number threshold. In one embodiment, the index output unit 13 determines whether the power corresponding to a frequency index $I_{co\_r1\_1}$ to the right of the cut-off frequency index $I_{co\_r1}$ is smaller than the cut-off power $P_{co}$. If the power corresponding to the frequency index $I_{co\_r1\_1}$ is smaller than the cut-off power $P_{co}$, the index number N1 is added by 1, wherein an initial value of the index number N1 is 0, i.e., N1=0+1=1. Next, the index output unit 13 checks whether the index number N1 is equal to an index number threshold Nth1. For example, the index number threshold Nth1 may be stored in a buffer (not shown) of the index output unit 13. If the index number N1 is smaller than the index number threshold Nth1, the index output unit 13 continues determining whether the power corresponding to a frequency index $I_{co\_r1\_2}$ (not shown) to the right of the frequency index $I_{co\_r1\_1}$ is smaller than the cut-off power $P_{co}$. If the power corresponding to the frequency index $I_{co\_r1\_2}$ is smaller than the cut-off power $P_{co}$, the index number N1 is added by 1, i.e., N1=1+1=2. The above is repeated until the index number N1 is equal to the index number threshold Nth1, e.g., N1=Nth1=2000, and the index output unit 13 then outputs the cut-off frequency index $I_{co\_r1}$ stored in the buffer to the symbol rate calculating unit 14.

Similarly, starting from the maximum power frequency index $I_{max}$ and towards the left, the index searching unit 12 identifies a frequency index corresponding to the cut-off power $P_{co}$ as a cut-off frequency index $I_{co\_l1}$, as shown in FIG. 2. After the index output unit 13 has checked that the powers corresponding to the frequency indices $I_{co\_l1\_1}$ to $I_{co\_l1\_Nth1}$ to the left of the cut-off frequency index $I_{co\_l1}$ are all smaller than the cut-off power $P_{co}$, the maximum cut-off frequency index $I_{co\_l1}$ is outputted to the symbol rate calculating unit 14.

The symbol rate calculating unit 14 calculates a symbol rate of the input signal according to the cut-off frequency index. In one embodiment, the symbol rate calculating unit 14 estimates a symbol rate SR of the input signal $S_{in}$ according to the cut-off frequency indices $I_{co\_r1}$ and $I_{co\_l1}$. For example, the symbol rate SR may be calculated according to the following equation:

$$SR=((I_{co\_r1}-I_{co\_l1})/FFT\_size)*Fs$$

In the equation, FFT_size is a resolution that the PSD estimating unit 11 uses for performing Fourier transform on the input signal $S_{in}$, and Fs is a sampling rate the receiver uses to sample the input signal $S_{in}$.

It should be noted that, the PSD estimating unit 11, the index searching unit 12, the index output unit 13 and the symbol rate calculating unit 14 can usually be realized by dedicated hardware circuits or software programs. Further, software/hardware implementation details of the PSD estimating unit 11, the index searching unit 12, the index output unit 13 and the symbol rate calculating unit 14 are generally known to one person skilled in the art, and shall be omitted herein.

Figure 3:
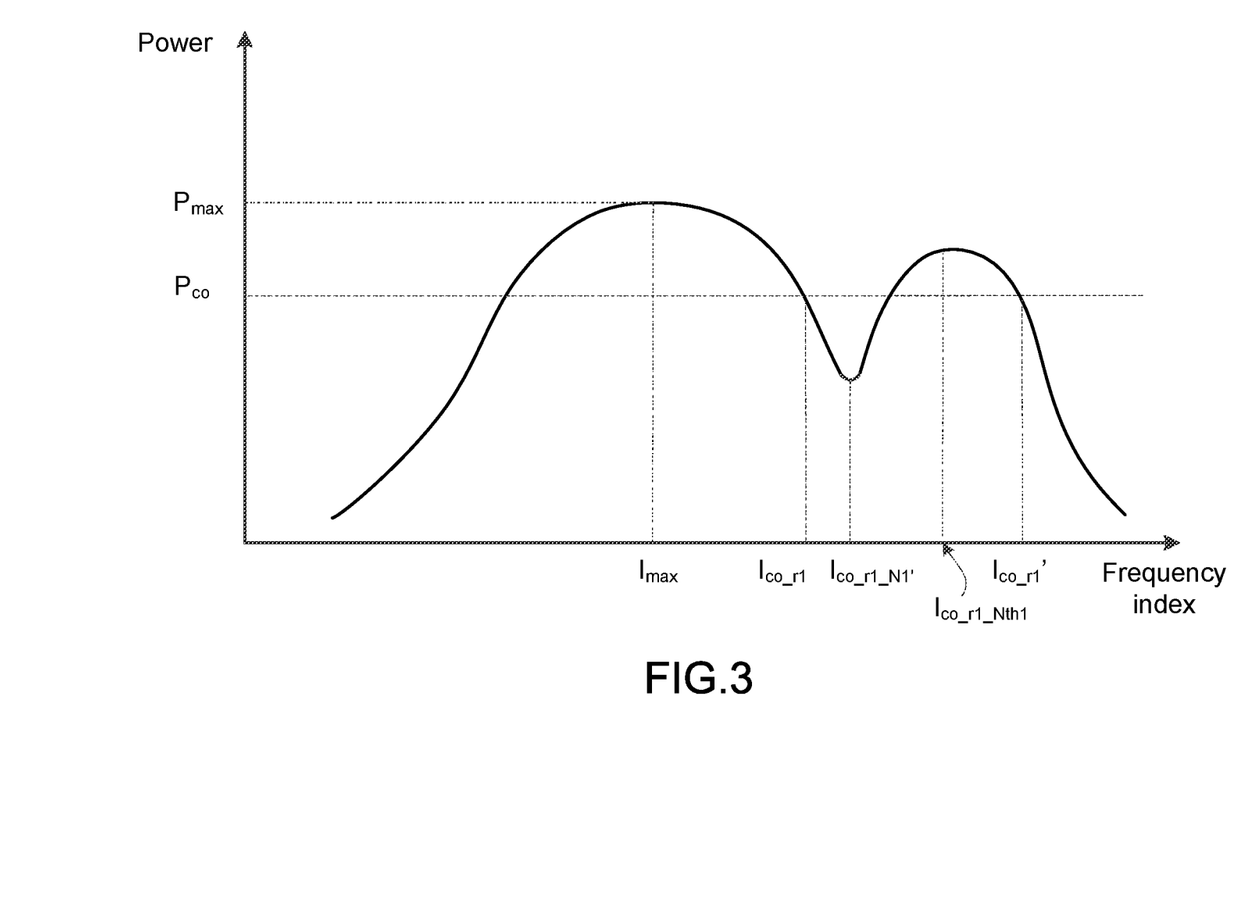
FIG. 3 is a schematic diagram of a PSD of an input signal having adjacent channel interference (ACI)

FIG. 3 shows a schematic diagram of an example of a PSD of an input signal having ACI. When an input signal has ACI; the PSD of the input signal may be as shown in FIG. 3. To the right of the real cut-off frequency index $I_{co\_r1}$, the number N1' of frequency indices corresponding to powers smaller than the cut-off frequency $P_{co}$ has not reached the index number threshold Nth1 (e.g., N1'=1500, Nth1=2000), such that the index output unit 13 may output an incorrect cut-off frequency index $I_{co\_r1'}$ instead of the real cut-off frequency index $I_{co\_r1}$. As a result, the subsequent symbol rate calculating unit 14 estimates the symbol rate of the input signal according to the incorrect cut-off frequency index $I_{co\_r1'}$ and obtains an incorrect symbol rate.

Figure 4:
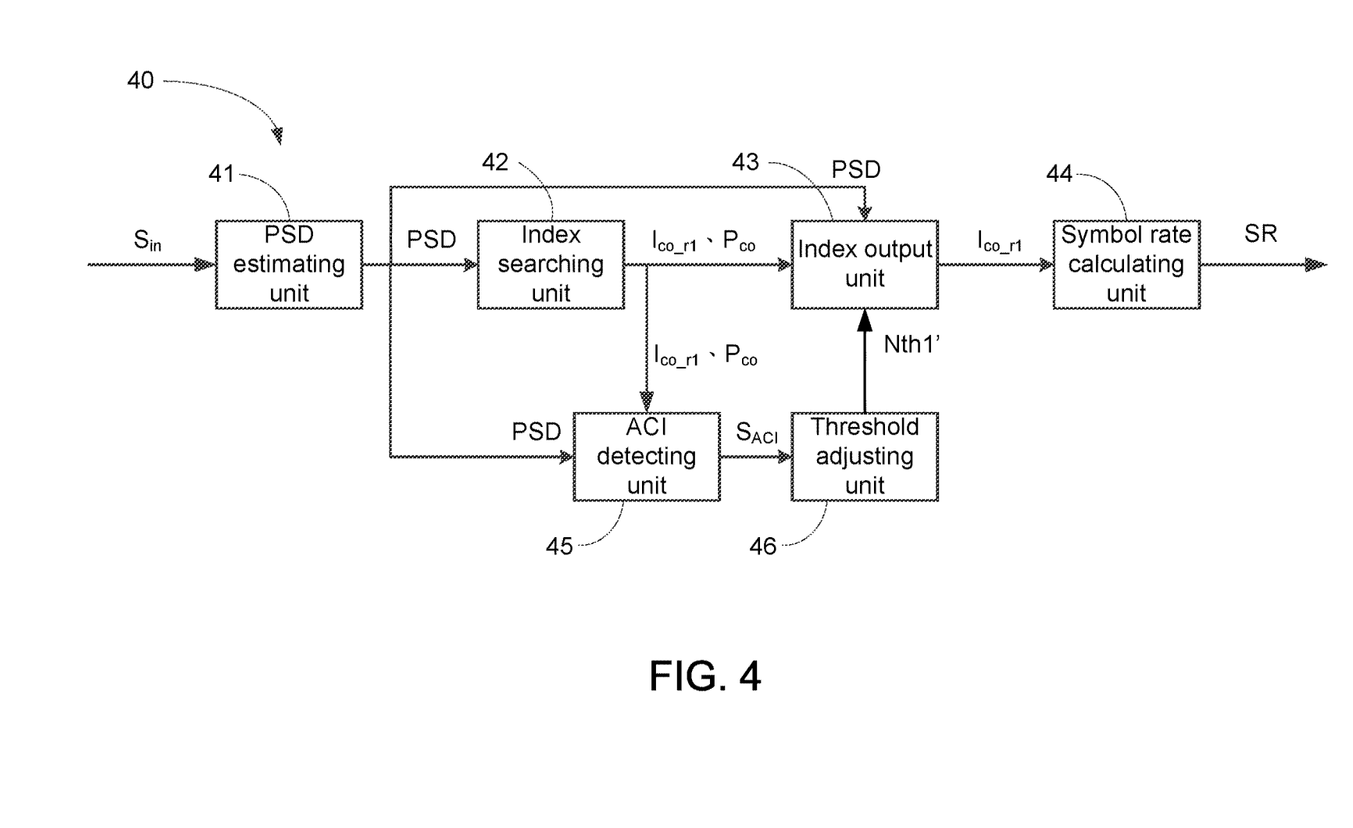
FIG. 4 is a block diagram of a symbol rate estimating device according to an embodiment of the present invention.
Figure 5:
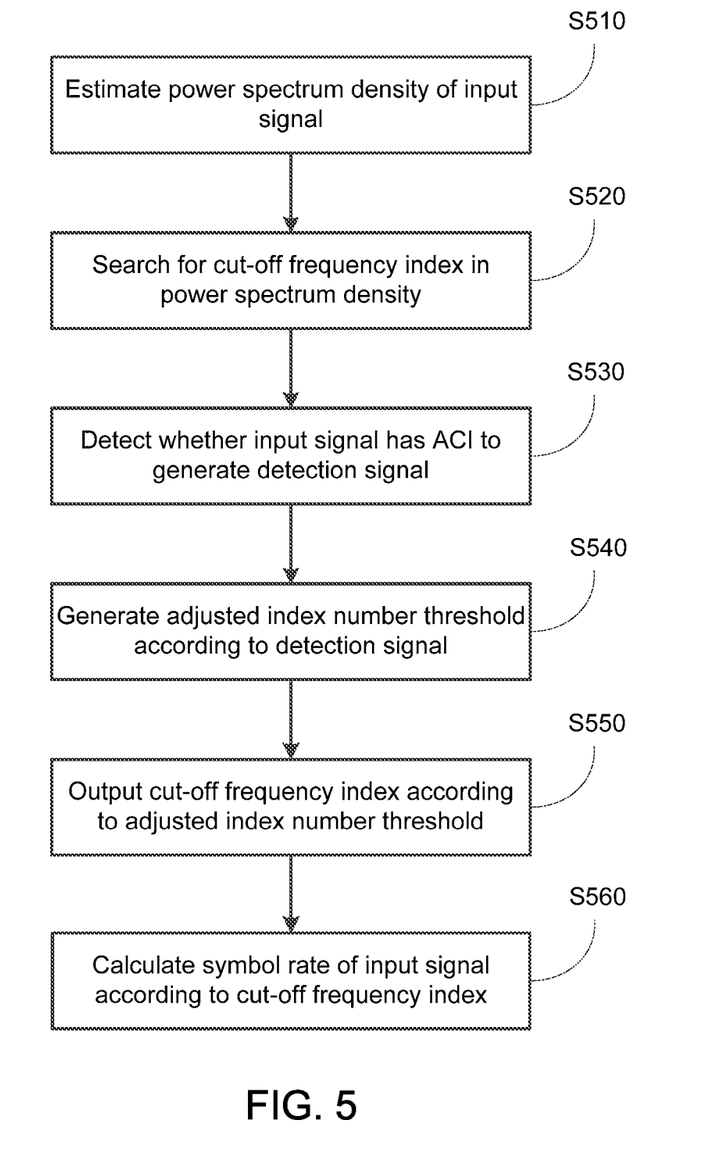
FIG. 5 is a flowchart of a symbol rate estimating method according to an embodiment of the present invention.

FIG. 4 shows a block diagram of a symbol rate estimating device 40 according to an embodiment of the present invention. The symbol rate estimating device 40 includes a PSD estimating unit 41, an index searching unit 42, an index output unit 43, a symbol rate calculating unit 44, an ACI detecting unit 45, and a threshold adjusting unit 46. FIG. 5 shows a flowchart 50 of a symbol rate estimating method according to an embodiment of the present invention. Referring to FIG. 4 and FIG. 5, the PSD estimating unit 41 estimates a PSD of an input signal (step S510), and the index searching unit 42 searches for a cut-off frequency index in the PSD (step S520). Details of the PSD estimating unit 41, the index searching unit 42, the index output unit 43 and the symbol rate calculating unit 44 can be referred from the description associated with the PSD estimating unit 11, the index searching unit 12, the index output unit 13 and the symbol rate calculating unit 14, and shall be omitted herein.

Figure 6:
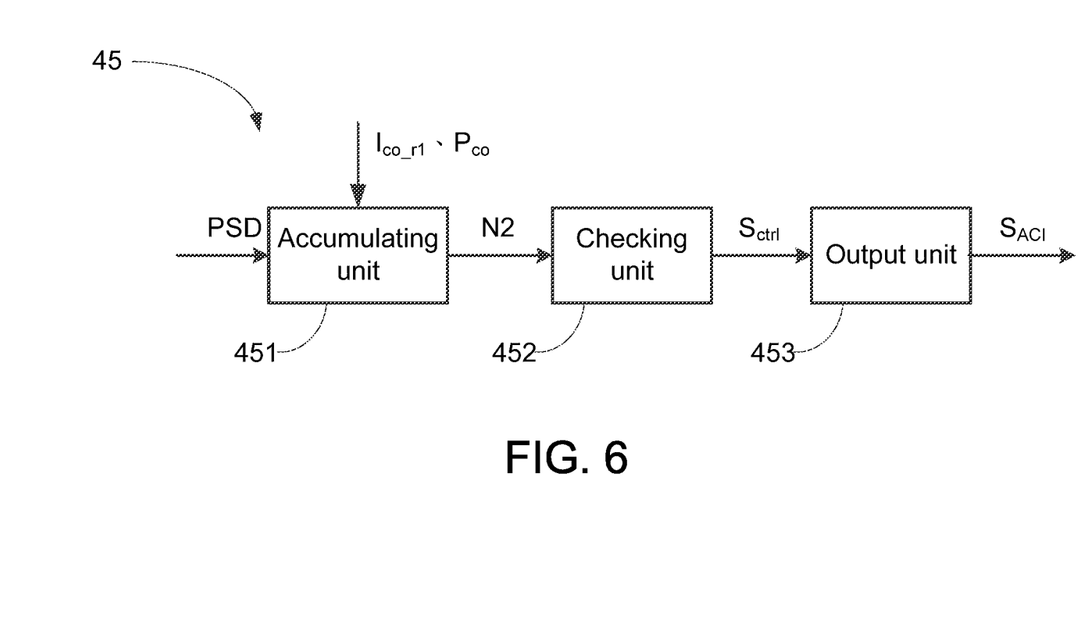
FIG. 6 is a block diagram of an ACI detecting unit according to an embodiment of the present invention.
Figure 7:
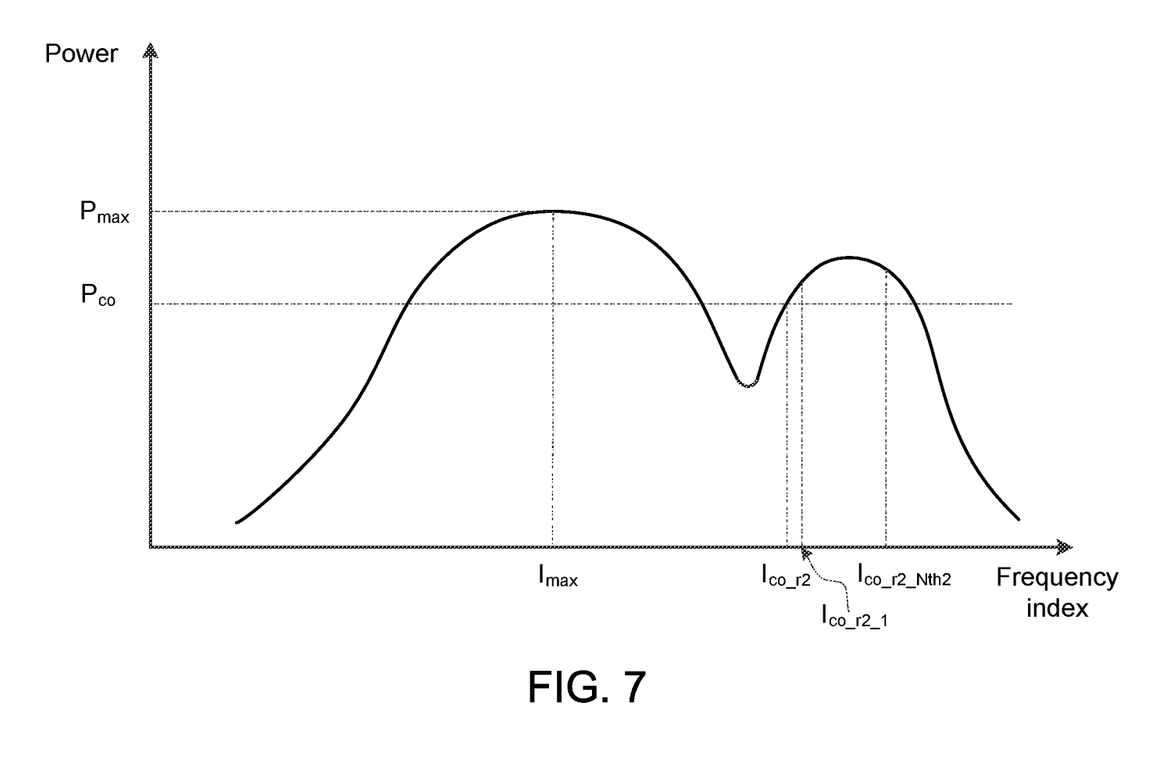
FIG. 7 is a schematic diagram of an example of a PSD of an input signal having ACI.

The ACI detecting unit 45 detects whether the input signal has ACI to generate a detection signal (step S530). FIG. 6 shows a block diagram of the ACI detecting unit 45 according to an embodiment of the present invention. In one embodiment, the ACI detecting unit 45 includes an accumulating unit 451, a checking unit 452 and an output unit 453. FIG. 7 shows a schematic diagram of an example of a PSD of an input signal having ACI. Referring to FIG. 6 and FIG. 7, the accumulating unit 451 accumulates an index number N2 of frequency indices, subsequent to the cut-off frequency index $I_{co\_r2}$, corresponding to powers greater than the cut-off power $P_{co}$. More specifically, the accumulating unit 451 determines whether the power corresponding to a frequency index $I_{co\_r2\_1}$ to the right of the cut-off frequency index $I_{co\_r2}$ is greater than the cut-off power $P_{co}$, and the index number N2 is added by 1 if the power corresponding to the frequency index $I_{co\_r2\_1}$ is greater than the cut-off frequency $P_{co}$, wherein the initial value of the index number N2 is 0, i.e., N2=0+1=1. Next, the checking unit 452 checks whether the index number N2 is equal to an index number threshold Nth2. If the index number N2 is smaller than the index number threshold Nth2, the accumulating unit 451 continues determining whether the power corresponding to a frequency index $I_{co\_r2\_2}$ to the right of the cut-off frequency index $I_{co\_r2\_1}$ is greater than the cut-off power $P_{co}$, and the index number is added by 1 if the power corresponding to the frequency index $I_{co\_r2\_2}$ is greater than the cut-off power $P_{co}$, i.e., N2=1+1=2. The above is repeated until the index number N2 is equal to the index number threshold Nth2, e.g., N2=Nth2=2000, and the checking unit 452 then outputs a control signal $S_{ctrl}$ to the output unit 453. The output unit 453 outputs a detection signal $S_{ACI}$ indicating that the input signal $S_{in}$ has ACI to the threshold adjusting unit 46 according to the control signal $S_{ctrl}$.

It should be noted that, the ACI detecting unit 45 of the present invention is not limited to the embodiment in FIG. 6. In other embodiments, the ACI detecting unit 45 may use other methods to detect whether the input signal has ACI to generate the detection signal.

Figure 8:
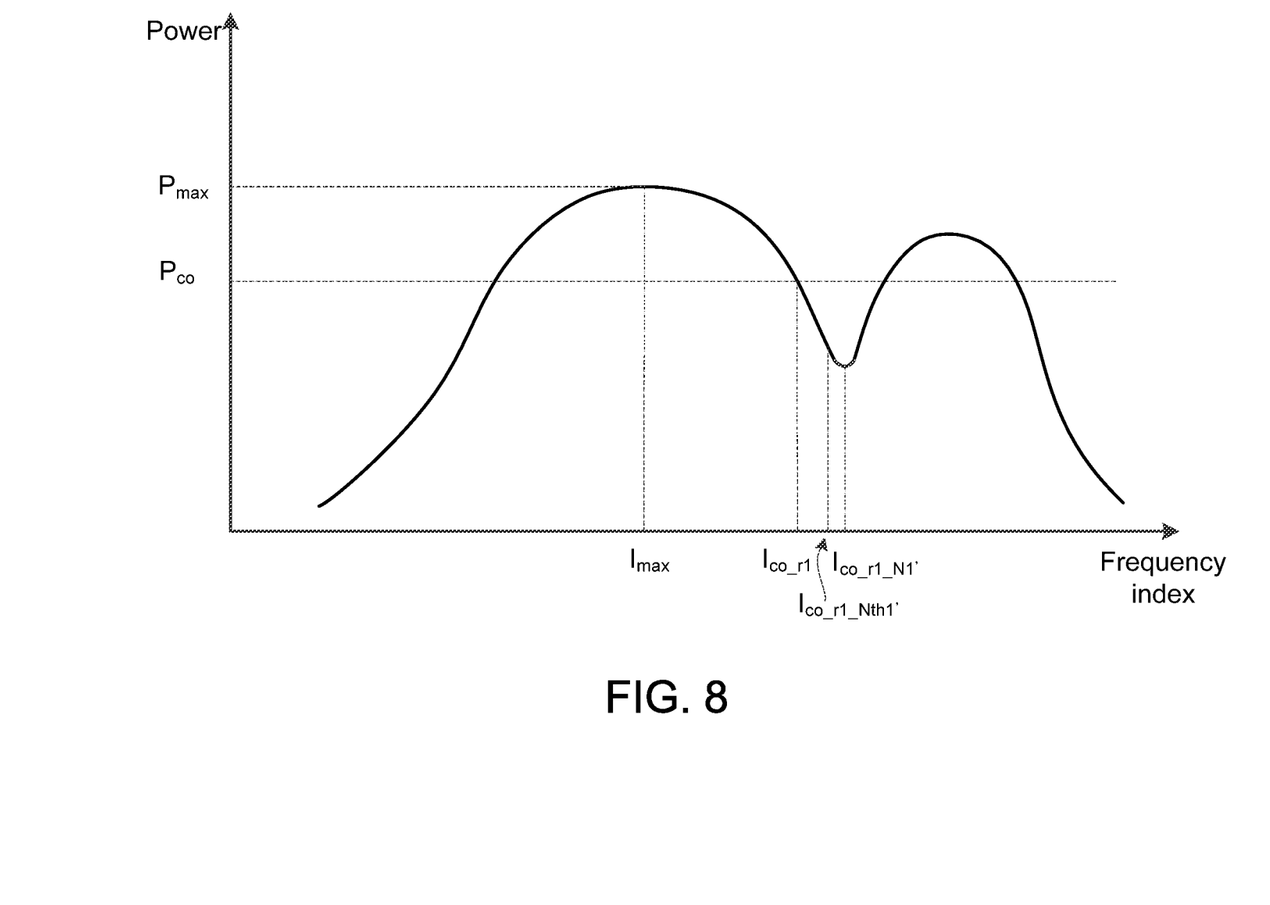
FIG. 8 is a schematic diagram of an example of a PSD of an input signal having ACI.

The threshold adjusting unit 46 generates an adjusted index number threshold according to the detection signal indicating that the input signal has ACI (step S540). In one embodiment, the threshold adjusting unit 46 decreases, according to the control signal $S_{ACI}$, the index number threshold Nth1 according to which the index output unit 43 outputs the cut-off index, to generate an adjusted index number threshold Nth1' (e.g., Nth1=2000, Nth1'=1000). Next, the index output unit 43 outputs the cut-off frequency index according to the adjusted index number threshold (step S550). For example, referring to FIG. 8, to the right of the real cut-off frequency index $I_{co\_r}$, even if the number N1' of the frequency indices corresponding to powers smaller than the cut-off power $P_{co}$ is decreased due to the effect of ACI (e.g., N1'=1500), because the frequency index number N1' is still greater than the adjusted index number threshold Nth1' outputted from the threshold adjusting unit 45 (e.g., Nth1'=1000), the index output unit 43 can still output the real cut-off frequency index $I_{co\_r1}$. As such, the symbol rate calculating unit 44 can also correctly calculate the symbol rate SR of the input signal $S_{in}$ according to the cut-off frequency index $I_{co\_r1}$ (step S560).

In one embodiment, the cut-off power $P_{co}$ is, for example, a 3 db cut-off power. In other words, the ACI detecting unit 45 generates the detection signal $S_{ACI}$ according to the 3 db cut-off power to control the threshold adjusting unit 46 to adjust an index number threshold according to which the index output unit 43 outputs the 3 db cut-off frequency index. However, the present invention is not limited thereto. In another embodiment, the ACI detecting unit 45 generates the detection signal $S_{ACI}$ according to the 6 db or 9 db cut-off power to control the threshold adjusting unit 46 to adjust an index number threshold according to which the index output unit 43 outputs a 6 db or 9 db cut-off frequency index.

Figure 9:
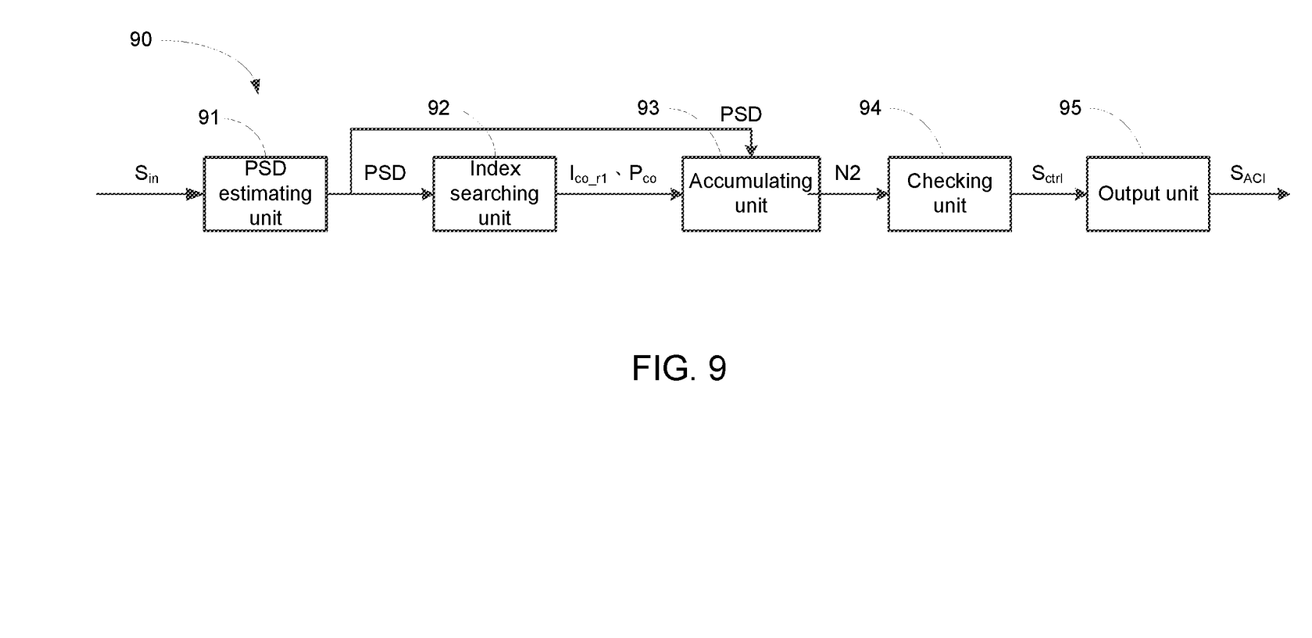
FIG. 9 is a block diagram of an ACI detecting device according to an embodiment of the present invention.

FIG. 9 shows a block diagram of an ACI detecting device 90 according to an embodiment of the present invention. The ACI detecting unit 90 includes a PSD estimating unit 91, an index searching unit 92, an accumulating unit 93, a checking unit 94 and an output unit 95. The PSD estimating unit 91 estimates a PSD of an input signal. The index searching unit 92 searches for a cut-off frequency index in the PSD. The accumulating unit 93 accumulates an index number of frequency indices, subsequent to the cut-off frequency index, corresponding to powers greater than the cut-off power. The checking unit 94 checks whether the index number is equal to a predetermined index number threshold to generate a control signal. The output signal 95 outputs a detection signal indicating that the input signal has ACI according to the control signal. Details of the PSD estimating unit 91, the index searching unit 92, the accumulating unit 93, the checking unit 94 and the output unit 95 can be referred from the above description associated with the PSD estimating unit 11, the index searching unit 12, the accumulating unit 451, the checking unit 452 and the output unit 453, and shall be omitted herein.

In conclusion, in the present invention, when it is detected that an input signal has ACI; the index number threshold according to which the index output unit outputs the cut-off frequency index is decreased to enhance the accuracy of the symbol rate estimating device.

While the invention has been described by way of example and in terms of the embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A symbol rate estimating device, comprising hardware circuits and configured to:
    estimate a power spectrum density (PSD) of an input signal, wherein the PSD comprises a plurality of frequency indices respectively corresponding to a plurality of powers;
    search for a cut-off frequency index in the PSD;
    detect adjacent channel interference (ACI) in the input signal to generate a detection signal;
    generate an adjusted index number threshold according to the detection signal indicating that the input signal has ACI;
    output the cut-off frequency index according to the adjusted index number threshold; and
    calculate a symbol rate of the input signal according to the cut-off frequency index.

2. The symbol rate estimating device according to claim 1, further configured to adjust the index number threshold by decreasing the index number threshold.

3. The symbol rate estimating device according to claim 1,
    further configured to accumulate an index number of frequency indices, subsequent to the cut-off frequency index, corresponding to powers greater than a cut-off power;
    check whether the index number is equal to a predetermined index number threshold; and
    output the detection signal indicating that the input signal has ACI when the index number is equal to the predetermined index number threshold.

4. The symbol rate estimating device according to claim 1, wherein the cut-off frequency index corresponds to a 3 db power in the PSD.

5. A symbol rate estimating method, comprising:
    estimating a power spectrum density (PSD) of an input signal, wherein the PSD comprises a plurality of frequency indices respectively corresponding to a plurality of powers;
    searching for a cut-off frequency index in the PSD;
    detecting whether the input signal has adjacent channel interference (ACI) to generate a detection signal;
    generating an adjusted index number threshold according to the detection signal indicating that the input signal has ACI;
    outputting the cut-off frequency index according to the adjusted index number threshold; and
    calculating a symbol rate of the input signal according to the cut-off frequency index.

6. The symbol rate estimating method according to claim 5, wherein the step of adjusting the index number threshold comprises:
    decreasing the index number threshold.

7. The symbol rate estimating method according to claim 5, wherein the step of detecting whether the input signal has ACI to generate the detection signal comprises:
   accumulating an index number of frequency indices, subsequent to the cut-off frequency index, corresponding to powers greater than a cut-off power;
   checking whether the index number is equal to a predetermined index number threshold; and
   outputting the detection signal indicating that the input signal has ACI when the index number is equal to the predetermined index number threshold.

8. The symbol rate estimating method according to claim 5, wherein the cut-off frequency index corresponds to a 3 db power in the PSD.

9. An adjacent channel interference (ACI) detecting device, comprising hardware circuits configured to:
   estimate a power spectrum density (PSD) of an input signal, wherein the PSD comprises a plurality of frequency indices respectively corresponding to a plurality of powers;
   search for a cut-off frequency index in the PSD;
   accumulate an index number of a plurality of consecutive indices, subsequent to the cut-off frequency index, corresponding to powers greater than a cut-off power;
   check whether the index number is equal to a predetermined index number threshold to generate a control signal; and
   output a detection signal indicating that the input signal has ACI according to the control signal.

* * * * *